United States Patent [19]
Andre

[11] Patent Number: 4,620,083
[45] Date of Patent: Oct. 28, 1986

[54] DEVICE FOR REGULATING THE COOKING PROCESS IN A COOKING VESSEL

[75] Inventor: Wolfram K. Andre, Eichenweg, Fed. Rep. of Germany

[73] Assignee: Kurt Wolf & Co. KG, Fed. Rep. of Germany

[21] Appl. No.: 590,420

[22] Filed: Mar. 15, 1984

[30] Foreign Application Priority Data

Apr. 21, 1983 [DE] Fed. Rep. of Germany ....... 3314398

[51] Int. Cl.⁴ ............................................. H05B 1/02
[52] U.S. Cl. .................................. 219/491; 219/497; 340/589
[58] Field of Search ................. 219/10.55 B, 497, 499, 219/494, 501, 490, 508; 340/588, 870.17, 589; 99/325, 327, 328, 333

[56] References Cited

U.S. PATENT DOCUMENTS 3,543,006 11/1970 Fjellstedt ............................ 219/494
4,077,690 3/1978 Koether ............................... 99/328
4,379,964 4/1983 Karazawa et al. .................. 219/497
4,471,354 9/1984 Smith ............................ 340/870.17

FOREIGN PATENT DOCUMENTS 413089 4/1925 Fed. Rep. of Germany .
1765499 12/1971 Fed. Rep. of Germany .
2634110 2/1977 Fed. Rep. of Germany .
2932039 2/1981 Fed. Rep. of Germany .
3004088 8/1981 Fed. Rep. of Germany .
2041583 9/1980 United Kingdom .
2087101 5/1982 United Kingdom .

Primary Examiner—M. H. Paschall
Attorney, Agent, or Firm—Thomas W. Speckman

[57] ABSTRACT

A device for regulating the cooking process in a cooking vessel which is heated by a heating element provided with a control circuit. The temperature in the cooking vessel is measured and is utilized by the control circuit to regulate the heating element. The cooking time can be preset by an adjustable timer. The cooking time in the cooking vessel is made independent of the inertia inherent in the cooking system by causing the timer to start metering the preset cooking time only after the cooking temperature has been reached. The operation of the timer may be governed by the slope of the temperature-time curve during the heating phase to enable the timer to shut off the heating element prematurely, relative to the preset cooking time, as the temperature-time curve rises less steeply during the heating phase.

6 Claims, 3 Drawing Figures

DEVICE FOR REGULATING THE COOKING PROCESS IN A COOKING VESSEL

BACKGROUND OF THE INVENTION

1. Field of the Invention

The present invention relates to a device for regulating the cooking process in a cooking vessel which is heated by a heating element provided with a control circuit. The temperature in or at the cooking vessel is registered and is utilized by the control circuit to regulate the heating element. The cooking time is preset by an adjustable timer.

2. Description of the Prior Art

Devices of this type are known in which the timer is electrically and mechanically separate from the control circuit of the heating element and is set by hand. After the preset cooking time has elapsed, an optical and/or an acoustic signal is emitted by the timer indicating the end of the preset period of time for cooking. The control circuit and the heating element are then turned off manually.

In these prior devices, the cooking time is a predetermined period and makes no allowance for the time constant of the cooking system as a whole. Depending on the size of the cooking vessel, the heat output of the heating element and the contents of the cooking vessel, the cooking system as a whole undergoes various heating and cooling time periods during the heating and cooling phases, respectively, which are reflected by different slopes of the temperature-time curve for the cooking system. No allowance is made in the prior art devices for the differences in heating and cooling periods during the heating and cooling phases of the cooking system. However, this particular property of the cooking system affects the cooking time which is regulated by the preset time, and it may either be too short or too long. In the heating phase, represented by the upward slope of the temperature-time curve, the preset cooking period starts before the cooking temperature is reached, and this leads to a shortening of the preset cooking time. During the cooling phase, after the heating element has been turned off, the cooking system remains at the cooking temperature for some period of time so that the actual cooking time exceeds the previously set time.

SUMMARY OF THE INVENTION

An object of the present invention is to provide a device generally of the type referred to in the foregoing, in which the inertia factor inherent in the cooking process is automatically taken into account during the heating and cooling phases so that the preset cooking time is maintained regardless of the character of these phases.

This object is achieved according to the invention in that the timer starts to meter the preset cooking time only after the cooking temperature has been reached, that the operation of the timer is dependent upon the slope of the temperature-time curve during the heating phase, and that the timer is caused to shut off the heating element prematurely, the extent of the premature shut off increasing as the temperature-time curve rises less steeply during the heating phase.

Regulating the timer according to a given temperature-time curve allows automatic adjustment of the preset cooking time with respect to the cooking system so that, while regulating the timer during the heating and cooling phases with reference to its preset cooking time, the shut-off point for the heating element is controlled so that accurate preset cooking time is maintained in the cooking vessel. Since adjustment of the cooking time depends upon the cooking process in progress, the cooking system itself does not affect the preset cooking time for the cooking vessel. Rather, full allowance is made for the inherent inertial time in the cooking system, to preclude any unintentional shortening or lengthening of the cooking process.

According to one embodiment, the temperature in a cooking vessel is monitored by a temperature sensor with a signal emitter, which transmits by way of transmitting means signals indicating the temperature to a signal receiver, and the signal receiver emits control signals which are proportional to the temperature in the cooking vessel. By temperature in the cooking vessel is meant the temperature in and/or at the cooking vessel. Transmitting means may be of the wireless type, which is particularly advantageous in cooking vessels that are placed on heating elements such as electric hot plates and cooktops.

Monitoring the temperature-time curve until the point in time at which the cooking temperature is reached, is achieved according to another embodiment in that the control signals emitted by signal receiver are monitored for a signal indicating that the cooking temperature has been reached, and that when such signal is emitted, metering of the preset cooking time set by the timer is initiated.

Automatic monitoring of the heating phase and automatic adjusting of the cooking time preset by the timer to the conditions present in the cooking system are achieved in that a differential circuit is provided whereby a correction signal is derived from the control signal emitted by signal receiver, which correction signal is proportional to the slope of the temperature-time curve, and that this correction signal causes shortening of the preset cooking time which is inversely proportional to the slope of the temperature-time curve. Consequently, the heating element is shut off prematurely by an appropriate amount of time, the shut-off time being such that the preset cooking time is maintained in the cooking system during the cooling phase when inertial time inherent in the cooking system elapses. An indication of the amount of inertial time inherent in the cooking system is obtained by monitoring the heating phase, and this information is utilized to provide for a correspondingly early shut-off time for the heating element.

According to one embodiment, the correction signal, which is proportional to the slope of the temperature-time curve during the heating phase, is transmitted to the timer, and the timer's preset cooking time is correspondingly shortened. Thus, the preset cooking time is adjusted during the heating phase so that at the end of the controlled and adjusted period of cooking time previously set, the heating element can be safely turned off.

BRIEF DESCRIPTION OF THE DRAWINGS

The invention will be further described with reference to the accompanying drawings, in which.

DESCRIPTION OF THE PREFERRED EMBODIMENTS

Figure 1:
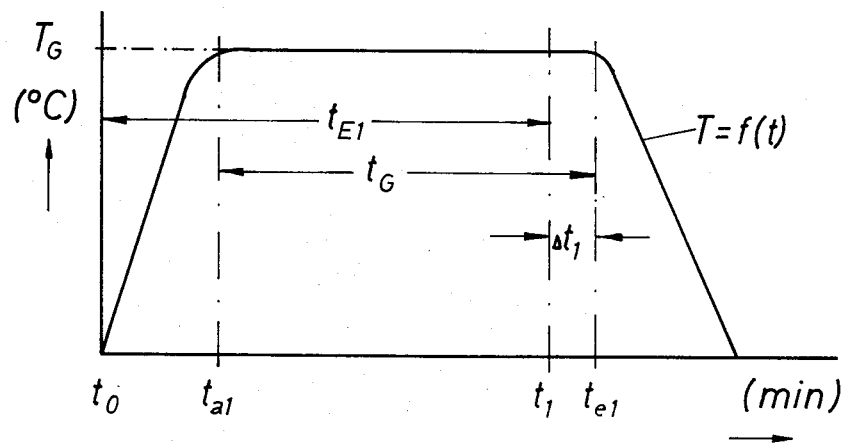
FIG. 1 is a graph of the temperature-time curve $T = f(t)$ of a cooking system under one set of conditions.

The temperature-time curve $T=f(t)$ shown in FIG. 1 rises steeply in the heating phase since the cooking temperature $T_G$ is reached at time $t_{a1}$, after switch-on time $t_o$. The temperature-time curve decline in the cooling phase is correspondingly steep. If at time $t_1$ the heating element is turned off, cooking temperature $T_G$ in the cooking vessel is sustained for a period of time $\Delta t_1$, due to inertia inherent in the cooking system. When setting the timer to cooking time $t_G$, the shut-off time for the heating element can be moved back by a timer interval $\Delta t_1$, if cooking time $t_G$ is measured from the point when cooking temperature $T_G$ is reached at time $t_{a1}$. Thus, cooking time $t_G$ in the cooking vessel extends from time $t_{a1}$, when the cooking temperature is reached during the heating phase, to time $t_{e1}$, when the temperature in the cooking vessel drops below the cooking temperature $T_G$, and the heating element is turned off at time $t_1$. Time $t_{E1}$ denotes the entire period of time during which the heating element is turned on.

Figure 2:
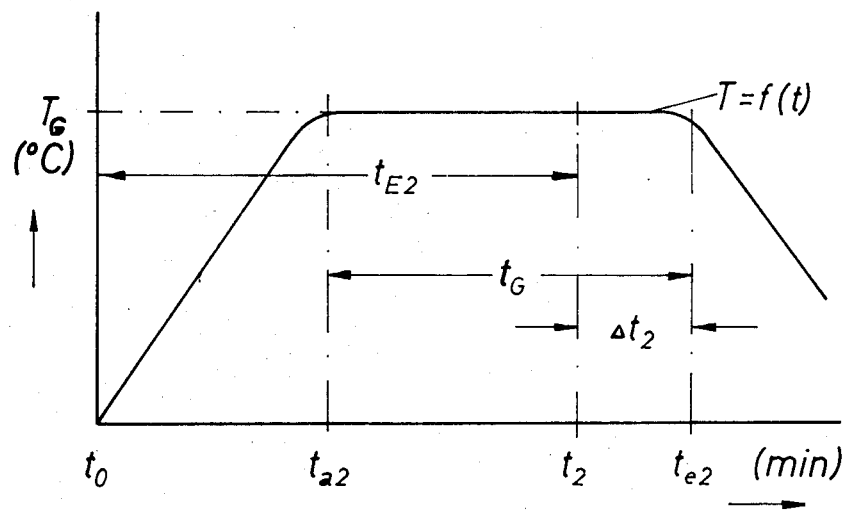
FIG. 2 is a graph of the temperature-time curve $T=f(t)$ of the same cooking system, under longer heat up conditions.

Increasing the essentially liquid contents in the cooking vessel of the cooking system represented in FIG. 1 by a substantial quantity yields a different temperature-time curve $T=f(t)$, as shown in FIG. 2. The inertia inherent in the cooking system is increased so that only after time $t_{a2}$ is cooking temperature $T_G$ reached in the cooking vessel. The slope of the temperature-time curve $T=f(t)$ during the heating phase is considerably less steep. Consequently, the temperature decrease during the cooling phase is correspondingly slower. When the heating element is turned off at time $t_2$, the cooking vessel sustains cooking temperature $T_G$ for a period of time $\Delta t_2$. Time interval $\Delta t_2$ is greater than time interval $\Delta t_1$ and may be selected so that the same cooking time $t_G$ is maintained in the cooking vessel with this temperature-time curve $T=f(t)$.

As illustrated by the temperature-time curves of FIGS. 1 and 2, it is important to begin metering the cooking time $t_G$ only after the cooking temperature $T_G$ has been reached, and to set the shut-off times $t_1$ and $t_2$ for the heating element so that, taking time intervals $\Delta t_1$ and $\Delta t_2$ into consideration, cooking time $t_G$ for the cooking vessel corresponds to the preset value and is independent of the course of temperature-time curve $T=f(t)$ during the heating and cooling phases. It will be appreciated that this will be regulated automatically if a control signal is emitted during the heating phase which corresponds to the rise of the temperature-time curve $T=f(t)$ in the heating phase. This control signal, then, can be derived from the slope of the temperature-time curve $T=f(t)$.

Figure 3:
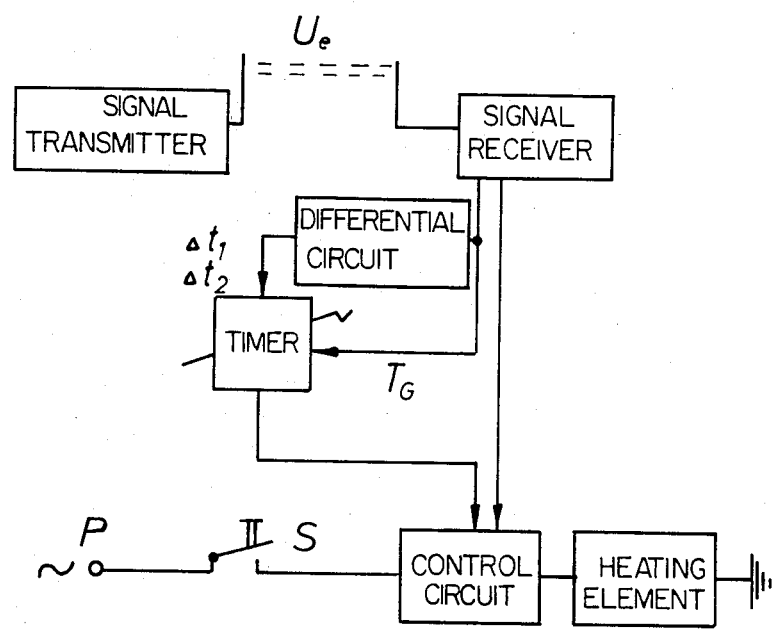
FIG. 3 is a schematic circuit diagram of a device for regulating the cooking time according to the invention.

The adjustability of the preset cooking time may be accomplished with a timer as is discussed with reference to the schematic circuit diagram of FIG. 3. The supply circuit for control circuit ST of heating element HE is closed by actuating switch S. The cooking vessel is heated by heating element HE. The temperature in the cooking vessel is registered by a temperature sensor having a signal transmitter TF. By means of the transmitting device Ue, signal transmitter TF supplies signals to signal receiver TE, which denote the temperature in the cooking vessel. Signal receiver TE is capable of emitting a control signal which corresponds to the temperature-time curve $T=f(t)$ of FIG. 1 or FIG. 2. The control signal emitted by signal receiver TE may be directly supplied to control circuit ST which controls the heat output of heating element HE in a known manner such that, following the heating phase, the preset cooking temperature $T_G$ is maintained.

The cooking time desired for the contents of the cooking vessel is set by adjustable timer GT. Timer GT is activated by the control signal emitted by signal receiver TE such that timer GT starts measuring the preset cooking time only when the control signal emitted by signal receiver TE indicates that cooking temperature $T_G$ has been reached. During the heating phase, a correction signal is derived by differential circuit DS, which correction signal is either directly or inversely proportional, respectively, to the slope of temperature-time curve $T=f(t)$ during the heating phase. This correction signal is supplied to timer GT preferably during the heating phase and is instrumental in automatically adjusting the preset time being metered. Depending upon the magnitude of the correction signal, which varies with the slope of temperature-time curve $T=f(t)$, a time interval $\Delta t_1$ or $\Delta t_2$ is subtracted from the preset cooking time $t_G$ by timer GT. When the preset time shortened as described has elapsed, heating element HE is shut off by control circuit ST. Time intervals $\Delta t_1$ and $\Delta t_2$ depend on the inertia inherent in the cooking system, which is reflected in the different temperature-time curves of FIGS. 1 and 2. Since heating element HE is turned off prior to the preset time by a period of time of $\Delta t_1$ or $\Delta t_2$, respectively, it is automatically ensured that cooking time $t_G$ is maintained inside the cooking vessel and, moreover, is independent of the course of the heating and cooling phases of the cooking system.

I claim:

1. In an apparatus of the type comprising a control circuit means and a timer means for regulating the cooking process in a cooking vessel heated by a heating element, wherein a desired cooking time is preset with said timer means, the improvement comprising: a signal transmitter means (TF) transmitting signals corresponding to the temperature in said cooking vessel to a signal receiver means (TE), said signal receiver means (TE) transmitting control signals proportional to said temperature in said cooking vessel to a control circuit means (ST), to a differential circuit means (DS), and to said timer means (GT), said control circuit means (ST) controlling said heating element (HE) during a heating phase extending from the time said heating element is activated until said desired cooking temperature ($T_G$) is reached, and during said cooking process, said timer means (GT) starting to measure said preset cooking time only after a desired cooking temperature ($T_G$) has been reached, said differential circuit means (DS) detecting differences between successive control signals over time and deriving a correction signal therefrom proportional to the slope of a temperature-time curve derived during said heating phase and transmitting said correction signal to said timer means (GT), said timer means (GT) adjusting said preset time ($t_G$) to an adjusted preset time by subtracting a time interval proportional to said correction signal from said preset time ($t_G$) and signalling said control circuit means (ST) after said adjusted preset time has elapsed and prior to elapse of said preset cooking time ($t_G$), said time interval increasing as said slope of said temperature-time curve in said heating phase decreases, and said control circuit means (ST) turning off said heating element upon receipt of said signal from said timer means (GT).

2. Apparatus according to claim 1, characterized in that said differential circuit means (DS) derives a correction signal from said control signal transmitted by said signal receiver means (TE), said correction signal is proportional to said slope of said temperature-time curve (T=f(t)) during said heating phase and is transmitted to said timer means (GT), and said timer means (GT) shortens said preset cooking time ($t_G$) by an interval of time ($\Delta t_1$, $\Delta t_2$) which is inversely proportional to said slope of said temperature-time curve (T=f(t)).

3. Apparatus according to claim 1, characterized in that a temperature sensor means is connected to said signal transmitter means (TF), said temperature sensor means measures said temperature in said cooking vessel, and said signal transmitter means (TF) transmits signals corresponding to temperature to said signal receiver means (TE) by way of transmitting means (Ue).

4. Apparatus according to claim 3, characterized in that said differential circuit means (DS) derives a correction signal from said control signal transmitted by said signal receiver means (TE), said correction signal is proportional to said slope of said temperature-time curve (T=f(t)) during said heating phase and is transmitted to said timer means (GT), and said timer means (GT) shortens said preset cooking time ($t_G$) by an interval of time ($\Delta t_1$, $\Delta t_2$) which is inversely proportional to said slope of said temperature-time curve (T=f(t)).

5. Apparatus according to claim 3, characterized in that said timer means (GT) monitors said control signals transmitted by said signal receiver means (TE) for a signal proportional to said desired cooking temperature ($T_G$), and said timer means (GT) is activated to measure said preset cooking time ($t_G$) when such control signal is transmitted.

6. Apparatus according to claim 5, characterized in that said differential circuit means (DS) derives a correction signal from said control signal transmitted by said signal receiver means (TE), said correction signal is proportional to said slope of said temperature-time curve (T=f(t)) during said heating phase and is transmitted to said timer means (GT), and said timer means (GT) shortens said preset cooking time ($t_G$) by an interval of time ($\Delta t_1$, $\Delta t_2$) which is inversely proportional to said slope of said temperature-time curve (T=f(t)).

* * * * *